United States Patent
Almgren et al.

[11] Patent Number: 6,137,993
[45] Date of Patent: Oct. 24, 2000

[54] METHOD AND APPARATUS FOR ESTIMATING PATH LOSS IN A RADIO COMMUNICATIONS SYSTEM

[75] Inventors: Magnus K. Almgren, Solna; Magnus C. Frodigh, Sollentuna, both of Sweden

[73] Assignee: Telefonaktiebolaget LM Ericsson, Stockholm, Sweden

[21] Appl. No.: 09/008,628

[22] Filed: Jan. 16, 1998

[30] Foreign Application Priority Data

Jan. 22, 1997 [SE] Sweden ................................. 9700176

[51] Int. Cl.$^7$ ................................................. H04Q 7/00
[52] U.S. Cl. ........................ 455/67.3; 455/67.1; 455/63; 455/522
[58] Field of Search ................................. 455/450, 501, 455/513, 522, 63, 67.3, 67.1

[56] References Cited

U.S. PATENT DOCUMENTS

| | | | |
|---|---|---|---|
| 4,328,581 | 5/1982 | Harmon et al. | 371/8 |
| 4,670,906 | 6/1987 | Thro | 455/56 |
| 4,736,453 | 4/1988 | Schloemer | 455/33 |
| 5,050,234 | 9/1991 | Ohteru | 455/34 |
| 5,134,709 | 7/1992 | Bi et al. | 455/33.1 |
| 5,148,548 | 9/1992 | Meche et al. | 455/34.1 |
| 5,157,709 | 10/1992 | Ohteru | 379/58 |
| 5,179,722 | 1/1993 | Gunmar et al. | 455/33.1 |
| 5,239,683 | 8/1993 | Usui | 455/63 |
| 5,287,544 | 2/1994 | Menich et al. | 455/33.1 |
| 5,293,640 | 3/1994 | Gunmar et al. | 455/33.1 |
| 5,491,837 | 2/1996 | Haartsen | 455/62 |
| 5,513,246 | 4/1996 | Jonsson et al. | 379/60 |

FOREIGN PATENT DOCUMENTS

| | | |
|---|---|---|
| 0 490 544A2 | 6/1992 | European Pat. Off. |
| 0673129A2 | 9/1995 | European Pat. Off. |
| 0 720 407A2 | 7/1996 | European Pat. Off. |
| 0720407 | 7/1996 | European Pat. Off. |
| 0 752 766A1 | 1/1997 | European Pat. Off. |
| 465 146 | 7/1991 | Sweden. |
| 500 830 | 9/1994 | Sweden. |
| 2 234 142 | 1/1991 | United Kingdom. |
| 2234142 | 1/1991 | United Kingdom. |
| 2 269 298 | 2/1994 | United Kingdom. |
| 2269298 | 2/1994 | United Kingdom. |

*Primary Examiner*—Daniel S. Hunter
*Assistant Examiner*—Thuan T. Nguyen
*Attorney, Agent, or Firm*—Burns, Doane, Swecker & Mathis, L.L.P.

[57] ABSTRACT

The present invention relates to a method and to apparatus for estimating path loss in a radio communications system. The path loss of single radio connections are modelled as amplification factors and can assume values between 0 and 1. The method is commenced by selecting at least one radio channel (chy). The power levels ($p_{iy,t}$) transmitted by those transmitters (MSi) that transmit on the selected channel is then determined (302). The power level ($s_{xy,t}$) received in a number of receivers (BSx) on the channel (chy) concerned is measured (303). The base station membership (BSa, BSx) of the transmitters and receivers is identified (304). Estimated percentile values ($\hat{G}^r_{ax,t}$) of the amplification factors of all combinations of transmitter and receiver pairs are generated with the transmitted and received power levels as input data. The generated values are stored (305) in an amplification element matrix as observations of the percentile values of amplification factors of pair-wise combinations of base stations (BSa–BSx). The method steps are repeated for all radio channels in the radio communications system, or for a subset of these radio channels, wherewith the amplification element matrix is updated with estimated percentile values of amplification factors of all pair-wise combinations of base stations in the radio communications system.

24 Claims, 8 Drawing Sheets

BASSTATIONER

X= 1  2  3 . . . . . . . n

|   | 1 | 2 | 3 | ... | n |
|---|---|---|---|---|---|
| 1 | $\hat{G}^r_{11,t}$ | $\hat{G}^r_{12,t}$ | $\hat{G}^r_{13,t}$ | — — — — — — — | $\hat{G}^r_{1n,t}$ |
| 2 | $\hat{G}^r_{21,t}$ | $\hat{G}^r_{22,t}$ | $\hat{G}^r_{23,t}$ | | |
| 3 | $\hat{G}^r_{31,t}$ | $\hat{G}^r_{32,t}$ | | | |
| . | | | | | |
| . | | | | | |
| . | | | | | |
| n | $\hat{G}^r_{n1,t}$ | — — | — — | — — — — — | $\hat{G}^r_{nn,t}$ |

BASSTATIONER

Fig.4

METHOD AND APPARATUS FOR ESTIMATING PATH LOSS IN A RADIO COMMUNICATIONS SYSTEM

FIELD OF INVENTION

The present invention relates to a method and apparatus for estimating attenuation, or path loss, in a mobile radio communications system. More specifically, the invention relates to a method and apparatus for estimating the values of statistically measured path loss in a mobile radio communications system.

BACKGROUND OF THE INVENTION

A radio connection over which radio communication can take place can be set up between a transmitter and a receiver in a radio communications system. The connection is two-directional, reference being made in this respect to a downlink which is the connection in a direction away from a base station in the radio communications system to a mobile station and an uplink which is the connection in the opposite direction, i.e. from the mobile station to the base station. The radio traffic on different connections is transmitted and received on radio channels that can be defined by a certain frequency in an FDMA system (Frequency Division Multiple Access), or by a combination of a certain frequency and a certain time slot in a system that uses TDMA (Time Division Multiple Access). In a CDMA system, (Code Division Multiple Access). A radio channel can be defined by a code.

The radio channels available in an FDMA system and a TDMA system can be reused. The signal strength received in a receiver on one radio channel may therefore include signal strength contributions from all transmitters that transmit on this radio channel. The distance between two transmitters that transmit on one and the same radio channel, the so-called repetition distance, should then be sufficiently large to avoid excessive co-channel interference on the desired received signal. In a CDMA system, the same frequencies can be used in all base stations in the radio communications system.

By interference is meant the sum of the signal strength of all received undesired signals on the radio channel used. These undesired signals arrive mainly from other connections that use the same radio channel in adjacent cells in the radio communications system. The received undesirable signals may also arrive from connections within the own cell, these connections using an adjacent frequency or time slot.

When the quality of a connection in a radio communications system is so poor as to be unacceptable, this may be due to the ratio between the signal strength of the desired signal and the interference being too low, among other things.

The signal strength or power level received by a receiver, e.g. a base station receiver, on a certain radio channel may thus contain contributions from several different transmitters in mobile stations that transmit on this radio channel in the radio communications system. The signal strength ratio between the desired signal (carrier) and the interfering signals is normally referred to as the C/I ratio (Carrier to Interference ratio) and is a measurement of call or channel quality.

The strength of the received signals will depend on the transmission power levels of those transmitters that transmit on the radio channel in question and to the extent to which the signals are attenuated on their way from the transmitters to the receiver. Attenuation, or path loss, is contingent on the distance, the direction and the topology between transmitter and receiver, among other things. Path loss can be seen as the inverse of radio channel amplification between values of 0 and 1, i.e. reduces along its path from the transmitter to the receiver. Thus, if a signal is attenuated five times, its amplification will be 0.2. Amplification can also be expressed in decibels, these values then becoming negative. Path gain and path loss are terms that can be used parallel with attenuation, as those skilled in this art are well aware.

The signal strength on a given radio channel can be measured at a receiver and the measured value then used as an indication of radio channel interference.

U.S. Patent Specification 5,157,709 describes an adaptive radio communications system that includes a control station which sets up an interference matrix for base interference values between base stations. Each base station measures power levels of signals received on idle radio channels. Information relating to the power levels received on idle radio channels and to the identity of the radio channels and base station are forwarded to the control station. The control station generates, on the basis of this information, an interference matrix that is used in adaptive channel allocation to the base stations.

U.S. Patent Specification 5,287,544 describes a method of obtaining a certain C/I value in a radio communications system with reduced transmitter power level. Idle radio channels are divided into groups in accordance with similar interference properties. Signal attenuation on the downlink between a base station and a mobile station is measured and the corresponding uplink value is calculated. Channels are allocated by selecting a radio channel from a channel group such as to obtain a certain desired C/I value at a certain transmission power level.

EP Patent Specification 0673129 describes a method of determining directly the C/I value in respect of co-channel and adjacent-channel interference. Received signals are processed mathematically in several stages, so as to finally give the C/I values.

For instance, the magnitude of the interference that a radio channel that shall be allocated to a certain connection will obtain can be predicted by estimating the interference or determining the C/I level in a radio communications system. One drawback with such methods, however, is that it is not possible to foresee how this newly established connection will influence connections that have already been set up and that use the same radio channel in the system.

DISCLOSURE OF THE INVENTION

The present invention addresses a problem of how path loss on different connections in a mobile radio communications system can be estimated from values of transmitted and received power levels on radio channels.

Another problem is one of realizing how estimated path loss values can be used to predict interference on connections in the system.

One object of the present invention is thus to enable path loss to be estimated in the radio communications system on the basis of direct measurement values of transmitted and received power levels.

Another object is to enable interference on connections in the radio communications system to be predicted on the basis of the estimated path loss distribution.

The problems are solved by measuring the power level received by a base station receiver or a mobile station receiver on a certain, or given, radio channel. The transmission power levels of those mobile station transmitters or base stations that use this radio channel are known. The values of the transmitted and received power levels are the basis for recursive iteration, wherewith estimated statistical measurements of the amplification distribution are generated. When the base station membership of each transmitter and receiver is known (which base station each transmitter and receiver belongs to), estimated values of a statistical measurement of the amplification factors of base station pairs can be generated. Power level measurements are taken on a number of channels, whereafter estimated statistical values of the amplification factors of all base station pairs in the radio communications system are obtained.

More specifically, the problems are solved by selecting a radio channel and determining the power level at which those transmitters that send on the radio channel transmit. The power level received on said radio channel in a number of receivers in the radio communications is measured. When the selected radio channel is an uplink channel, the transmitters are included in mobile stations and the receivers included in base stations. When the radio channel is, instead, a downlink channel, the transmitters are included in base stations and the receivers included in mobile stations. The power levels transmitted by mobile stations and base stations and the radio channels used and the base station to which respective mobile stations belong is known by the radio communications system. The base station membership for those transmitters that send on the same radio channel and those receivers in which power level is measured are identified. By means of a recursive procedure using the transmitted and received power levels as input data, the estimated values are generated channel-wise as a statistical measurement of stochastically distributed amplification factors for each transmitter and receiver pair. Respective generated values are stored as an observation of the statistical measurement of the amplification factor of respective combinations of base station pairs. The procedure is then carried out on further radio channels, therewith obtaining more, and updated, observations of amplification factors of combinations of base station pairs. Measurement of the stochastically distributed amplification factors may alternatively be carried out on all channels simultaneously, wherewith different observations of the amplification factor of the same base station pairs are stored together.

One advantage afforded by the invention is that it enables the statistical properties of path loss, or attenuation, in the radio communications system to be estimated continuously.

Another advantage is that the interference in the radio communications system to which connections which are about to be set up or change radio channels are subjected, and the interference induced by these connections, can be estimated.

The invention will now be described in more detail with reference to preferred embodiments thereof and also with reference to the accompanying drawings.

BRIEF DESCRIPTION OF THE DRAWINGS

FIG. 4 illustrates an attenuation matrix generated by the inventive method.

DESCRIPTION OF PREFERRED EMBODIMENTS

Although it is assumed in the following description of the inventive method and inventive apparatus that the radio communications system concerned is a GSM system, it will be understood that the invention may also be applied analogously with other radio communications systems, such as NMT and AMPS systems, both digital and, e.g., DAMPS and PDC systems, and also CDMA-based systems which, e.g., are implemented in accordance with IS-95 standards.

A signal transmitted from a transmitter will be attenuated prior to reaching the receiver, the degree of attenuation, or path loss, depending on the distance and topography between transmitter and receiver. The factor by which the transmitted signal strength is multiplied in order to obtain the received signal strength is here called the amplification factor. The amplification factor may take values between 0 and 1. Amplification factors will be used in the following description as a measurement of path loss in the system.

Figure 1:
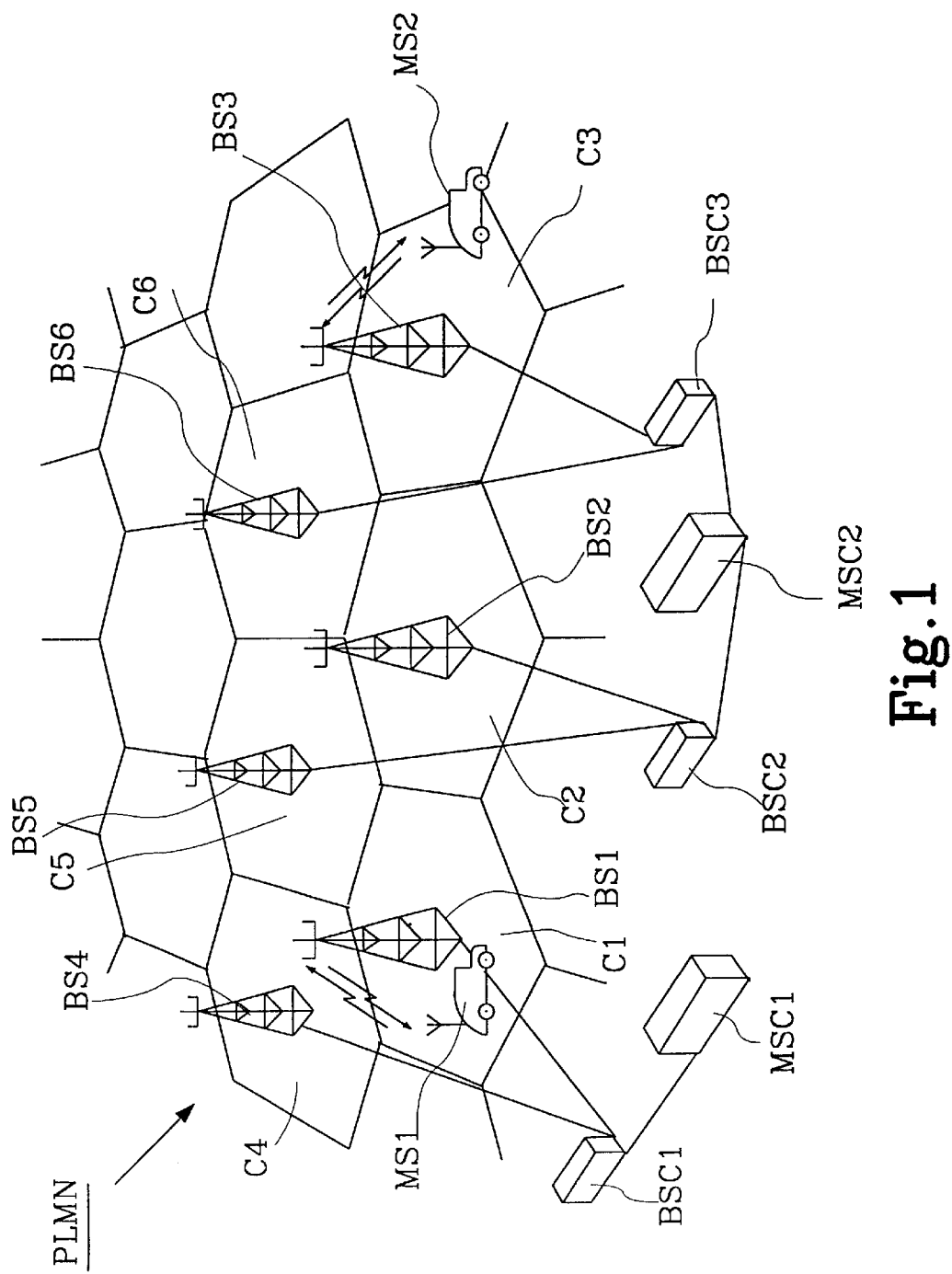
FIG. 1 illustrates schematically part of a GSM mobile radio communications system.

FIG. 1 is a schematic illustration of part of a radio communications system. A radio communications system includes a number of primary and secondary radio stations between which radio communication takes place over radio channels. The illustrated system is a cellular mobile radio network PLMN that includes base stations BS1–BS6. Each base station has a range within which radio communication can be achieved with mobile radio stations or mobile stations MS1–MS2 located within the radio coverage area. The cells C1–C6, which have been drawn as hexagons in FIG. 1, represent the geographical areas covered by the base stations BS1–BS6. The mobile stations MS1–MS2 communicate with the base station in the cell in which they are located, over two-way radio channels in uplink and in downlink.

Each base station BS1–BS6 includes a number of receivers for receiving signals on the uplink radio channels, and a number of transmitters for transmitting signals on the downlink radio channels. A receiver and a transmitter will normally be combined to form a transceiver. The number of transceivers in a base station will depend on the number of frequencies that the base station is allowed to use. A number of base stations BS2, BS5 are connected to a base station controller BSC2 and a number of base station controllers BSC2–BSC3 are connected to a mobile services switching centre MSC2.

In the following description, it is assumed that the radio communications system includes n number of base stations $BSx$, $x\epsilon 1 \ldots n$, and m numbers of mobile stations $MSi$, $i\epsilon I$; $I=1 \ldots m$. Furthermore, z number of different uplink radio channels $chy$, $y\epsilon Y$; are used in the radio communications system, wherein $Y=1 \ldots z$.

The following designations are used in the following description of the method according to the invention:

$p_{iy,t}$ denotes the transmitted power level on radio channel chy from the transmitter in the mobile station MSi at time t;

$s_{xy,t}$ denotes the received power level in a receiver included in base station BSx on radio channel chy at time t; and $g_{ix,t}$ is an amplification factor which denotes the extent to which the signal from a transmitter in a mobile station MSi to a receiver in a base station BSx is amplified at time t. The amplification factor may take the values between 0 and 1, meaning that the signal is attenuated.

Figure 2:
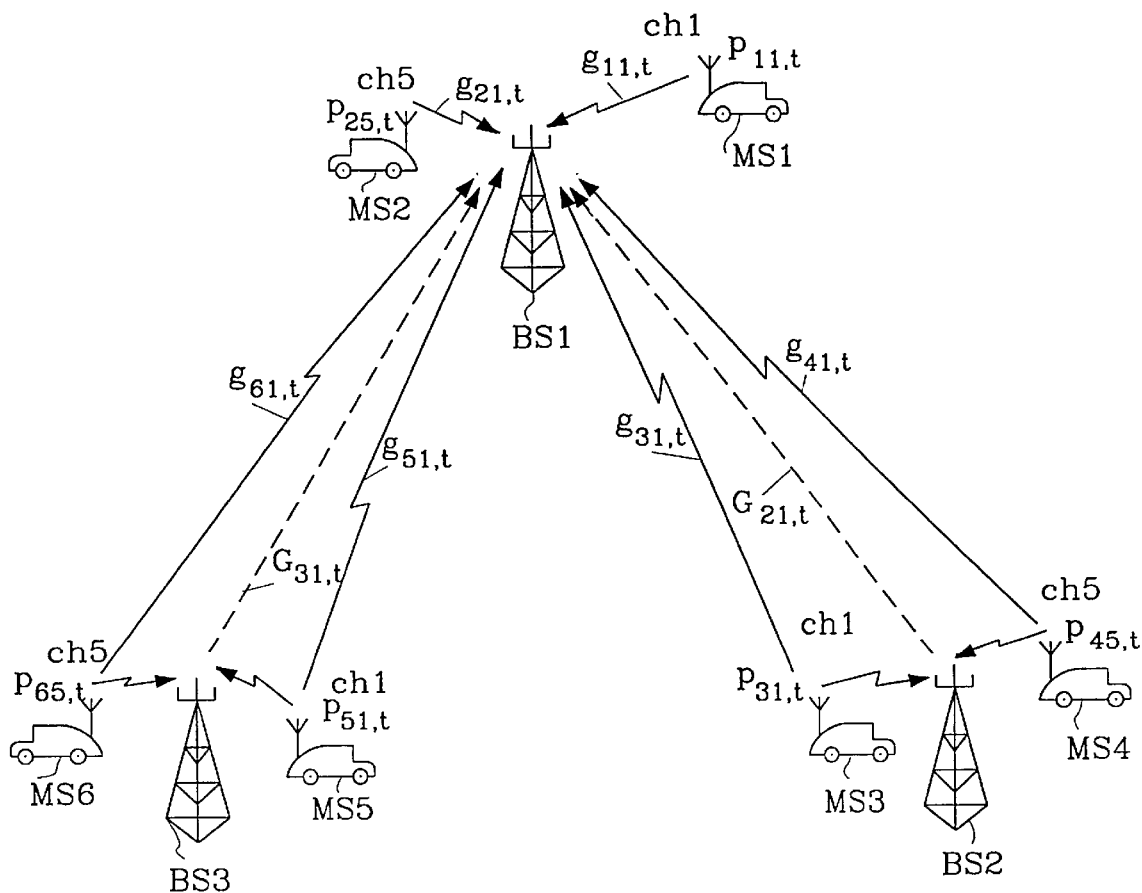
FIG. 2 is a simplified illustration of the uplink connections between a number of base stations and a number of mobile stations in a radio communications system.

FIG. 2 is a simplified illustration of the uplink connections between a number of base stations BS1–BS3 and a number of mobile stations MS1–MS6 in a radio communications system. The Figure shows the receiving situation in respect of the base station BS1 at a certain time point t. The base station BS1 receives a signal from a mobile station MS1 in the own cell, whose transmitter transmits a power level $p_{11,t}$ on a radio channel ch1 at time t. This signal is attenuated, wherewith the amplification factor value is $g_{11,t}$ at time t. The transmitter of the mobile station MS3 transmits the power level $p_{31,t}$ and communicates with a receiver in base station BS2 over the same radio channel CH1. The transmitter of the mobile station MS5 transmits the power level $p_{51,t}$ and communicates with a receiver in the base station BS3 also over the radio channel ch1.

The signals on the radio channel ch1 from the mobile stations MS2 and MS3 do not only reach the own base stations BS2 and BS3 but also the receiver in the base station BS1. However, these signals have been attenuated on their way to the base station BS1, wherewith the values of the amplification factor are $g_{31,t}$ and $g_{51,t}$. The total power level received in the receiver of base station BS1 on the radio channel ch1 at time t is therewith equal to the sum of the contributions from all transmitters in mobile stations that send signals on radio channel ch1, i.e.:

$$s_{11,t}=p_{11,t}g_{11,t}+p_{31,t}g_{31,t}+p_{51,t}g_{51,t}; \ 0<g_{ix,t}<1$$

It will be seen that the path loss, or attenuation, in respect of a connection in the own cell will preferably be low (high amplification factor) in comparison with the attenuation of a signal that is received by the own base station but transmitted by a mobile station belonging to another base station.

In the illustrated example, the three base stations are each in contact with a respective further mobile station MS2, MS4 and MS6 which transmit the power levels $p_{25,t}$, $p_{45,t}$ and $p_{65,t}$ on the radio channel ch5 at time t. As in the case described with reference to transmitting on the radio channel ch1, a receiver in the base station BS1 receives on radio channel ch5 signal contributions from all system transmitters that transmit on said radio channel ch5. In the illustrated example, the mobile stations MS4–MS6 transmit on radio channel ch5. These signals have been attenuated on their way from respective transmitters in the mobile stations to the receiver in the base station BS1, wherewith the values of the amplification factors are $g_{21,t}$, $g_{41,t}$ and $g_{61,t}$. The power level received at time t in the base station BS1 on radio channel ch5 can therefore be expressed as:

$$s_{15,t}=p_{25,t}g_{21,t}+p_{45,t}g_{41,t}+p_{65,t}g_{61,t}; \ 0<g_{ix,t}<1$$

The radio communications system determines the base station with which respective mobile stations shall communicate. Respective mobile stations are considered to belong to the base station to which they are connected. The amplification factors for a connection between a transmitter in a mobile station belonging to a certain base station BSa to a receiver in a base station BSx may take all values between 0 and 1, depending on movement of the mobile station. The values of these amplification factors can therefore be assumed to constitute observations of a stochastically distributed amplification factor $G_{ax,t}$ of the combination of base station pairs BSa and BSx.

In the illustrated example, it is conceivable to have two different observations $g_{31,t}$ and $g_{41,t}$ of the stochastically distributed amplification factor $G_{21,t}$ for connections between transmitters in mobile stations that belong to the base station BS2, and a receiver in the base station BS1. Similarly, it is also conceivable to have two observations $g_{51,t}$ and $g_{61,t}$ of the amplification factor $G_{31,t}$ of the combination of the base station pair BS3 and BS1.

The broken lines between the base station BS2 and the base station BS1, and between the base station BS3 and the base station BS1 are intended to give an understanding of the amplification factor of combinations of base station pairs.

The amplification factor $G_{ax,t}$; x,a∈X; X=1 . . . n of the combination of two base stations BSa–BSx thus behaves as a continual stochastic variable, i.e. it can take an infinite number of values within the interval $0<G_{ax,t}<1$, depending on where the mobile stations are located geographically and depending on the topography between the base stations.

A stochastic variable, in the present case the amplification factor of combinations of base station pairs $G_{ax,t}$, can be described with statistical measurements. For instance, it is possible to determine the mean value and the median value of the observations. The probability of an observation taking a lower or a higher value than a certain specified value can also be given. In order to describe how the observations divide statistically, there is considered the distribution function of a stochastic variable that gives the probability of an observation being below the value in question for each possible value, in the present case amplification factors that assume values between 0 and 1.

The function that is formed by derivation of the distribution function is called the density function, and the range of this function is 1. The density function describes how the probability mass 1 is distributed over the infinite number of possible values that the stochastic variable can take. When deciding a value such that the area beneath the density function to the left of this value is equal to a given number r, $0<r<1$, the so-called percentile value $G^r_{ax,t}$ is obtained. r is often given in percentage. A percentile value thus denotes a value which 100*r % of the observations of the stochastic variable lies beneath, i.e. $\Pr\{G_{ax,t}<G_{ax,t}^r\}=r$, (Pr= Probability).

The amplification factor is direction dependent in the sense that the amplification factor $G_{12,t}$, i.e. in respect of connections between transmitter in mobile stations belonging to the base station BS1 and receivers in the base station BS2, need not have the same distribution function as the amplification factor $G_{21,t}$ for connections between transmitters in mobile stations belonging to the base station BS2 and receivers in the base station BS1, and consequently these normally have differing percentile values.

It is not possible to determine statistical measurements of amplification factors solely by knowing the transmitted and the received power levels in the radio communications system. Consequently, it is necessary to estimate statistic measurements of the amplification factors of respective base station pairs in accordance with an inventive method described hereinafter.

Similar to the uplink case described with reference to FIG. 2, the signal strength or power level received by a receiver in a mobile station on a downlink radio channel includes greater or lesser contributions from all transmitters in system base stations that transmit power level on the radio channel in question. The signals deriving from transmitters in different base stations are attenuated to different extents on their way to a receiver in a given mobile station.

Theoretically, path loss in uplink and downlink should be the same, although it may differ slightly as a result of different transmitter and receiver antennas in a base station, and because different frequency bands are used. In order to obtain more observations and therewith more reliable estimations of statistical measurements of amplification factors, it may be desirable to take into account observations on the amplification factor in both uplink and downlink. For the sake of simplicity, the method will first be described with reference to uplink, i.e. to the case in which the received power level on radio channels is measured in receivers in the base stations.

When the values of statistical measurements on amplification factors between all combinations of base station pairs in the radio communications system have been estimated, these values can be used to estimate the interference on connections in the system. This can be used in several different applications. For instance, as will be described in more detail below, the values are used to obtain an overview of the interference situation when selecting radio channels for a base station that shall be installed in an existing radio communications system.

When establishing a call connection, the amplification factors can also be used in radio channel selection in a manner such that the interference induced in the radio communications system by newly setup connections will be low.

It is assumed in the following exemplifying embodiments of the invention that adjacent radio channels are completely separate, so that solely co-channel interference will occur between the cells.

Although it is possible to take into account adjacent channel interference when generating amplification factors, this will not be described in detail for reasons of simplicity.

In a GSM system, the power level $p_{iy,t}$ that a transmitter in a mobile station MSi shall transmit at a given time point t on a given uplink radio channel chy is determined by the base station controller BSC. Similarly, it is known on which downlink radio channels the base stations transmit and the power levels that shall be transmitted. The system also knows which power levels shall be transmitted by the transmitters and on which radio channels the transmitters transmit. The base station BSx to which respective mobile stations MSi belong is also known at each moment in time, i.e. the coverage area or cells of which base stations the mobile stations are located.

The radio communications system is able to change the power levels transmitted from the mobile stations at different points in time. Attenuation, or path loss, is also changed with time as the mobile stations move geographically, meaning that the received power levels are also changed with time. The transmitted power levels $p_{iy,t}$, the amplification factors $G_{ax,t}$ of combinations of base station pairs, and the received power levels $s_{xy,t}$, can therefore be seen as stochastic variables. In the illustrated case, the distribution functions for the stochastic variables are not known.

The inventive method uses a recursive algorithm that provides estimations of the values of statistical measurements of amplification factors between individual transmitters and receivers in the radio communications system. Thus, it is the statistical properties of the amplification, or attenuation, that is sought. The values obtained when applying the invention are probability estimations that a certain percentage of the actual observations will take these amplification factor values.

Figure 3:
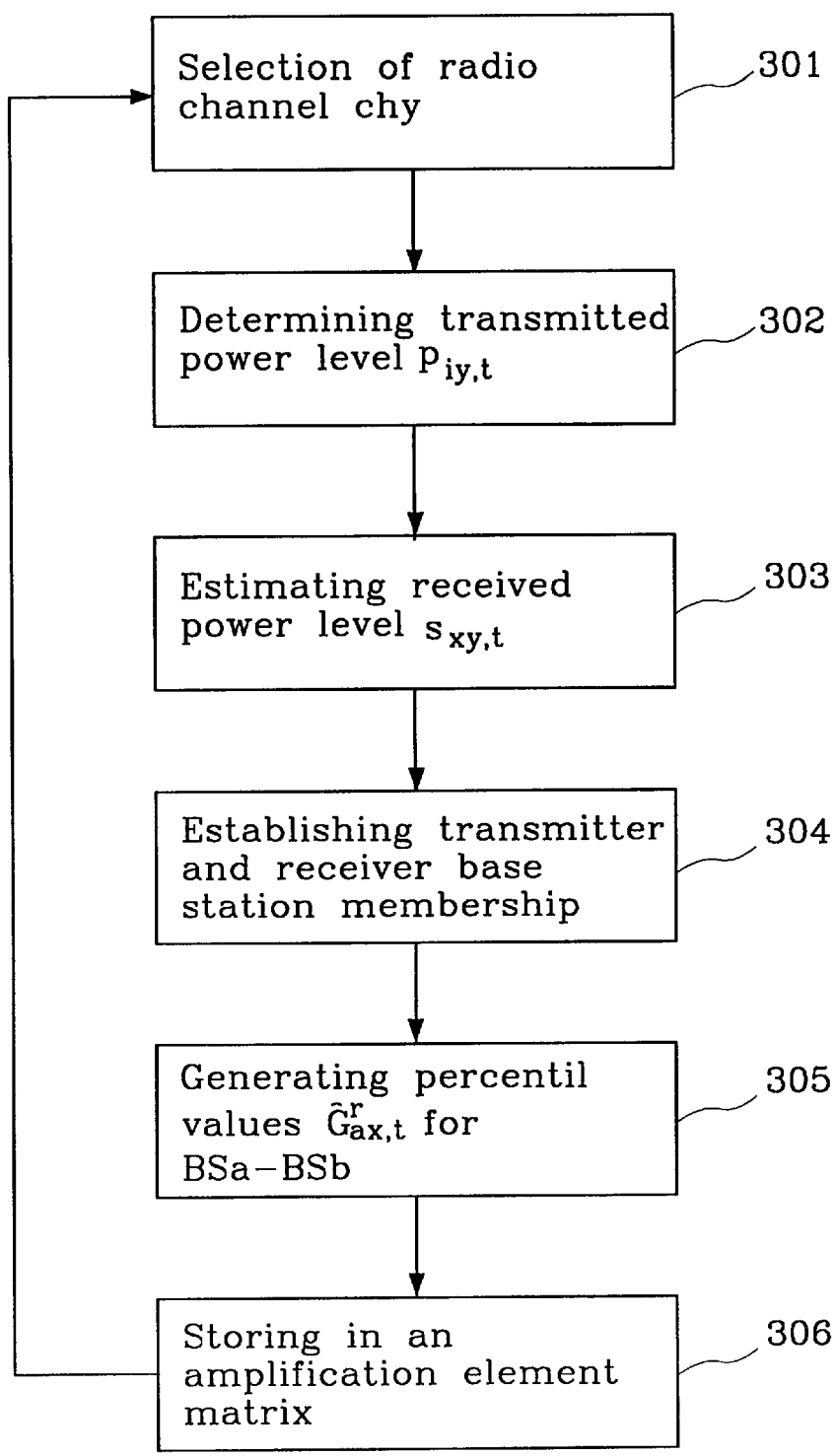
FIG. 3 is a flowchart illustrating the inventive method.

FIG. 3 is a flowchart that illustrates the method according to the invention, in which the generated values are estimated percentile values $\hat{G}^r_{ax,t}$ of the amplification factor in uplink for combinations of base station pairs BSa–BSx, x,a∈X, X=1 . . . n in the radio communications system.

A radio channel chy is selected in step 301. The radio channel selected in the illustrated case is an uplink radio channel.

The power level $p_{iy,t}$ that shall be transmitted at time t by those transmitters that transmit on the current radio channel chy is determined continually in step 302. The transmitters are included in mobile stations MSi in the illustrated case. The values are stored in a power level vector $P_{y,t}$.

The power level $s_{xy,t}$ received on the radio channel chy is measured continually in step 303 in a number of receivers that are included in base stations BSx in the illustrated case. A measuring process is carried out in each base station in the radio communications system in the illustrated embodiment.

The base station membership of the transmitters and receivers is identified in step 304. In the illustrated embodiment, the receivers are included in base stations and their base station membership is thus given. The transmitters are included in mobile stations and respective transmitters are then considered to belong to the base station to which the mobile station belongs.

An estimated percentile value $\hat{G}^r_{ax,t}$ for the amplification factor for each combination of transmitter and receiver pairs is generated in step 305. Each value is considered as an observation of the percentile value of the amplification factor of the combination of the base station BSa to which the transmitter concerned belongs and the base station BSx to which the receiver concerned belongs. The generation of this estimated percentile value will be described in more detail below with reference to FIGS. 5–7.

The estimated percentile values $\hat{G}^r_{ax,t}**$ in an amplification element matrix, this amplification element matrix containing percentile values for the amplification factor of each combination of base station pairs. The matrix is thus an n*n matrix, where n designates the number of base stations.

The method is then repeated from step 301, until all of the uplink radio channels, or a subset of said channels in the radio communications system have been selected, wherewith the amplification element matrix is updated for each new channel that is measured.

It is, of course, also possible to perform measurements on different channels simultaneously. This enables different observations of the percentile value of the amplification factor of one and the same base station pair to be obtained at one and the same time. These observations can then be combined, e.g. by forming a mean value, or by some other type of unweighted or weighted combining.

The same measurements may, of course, be carried out for all of the downlink radio channels or for a subset of said channels. As before mentioned, path loss in uplink and downlink may differ slightly. Estimated percentile values for amplification factors in downlink can be determined in the same way as that described above with reference to uplink. The power levels transmitted on different downlink radio channels by the base stations are determined. The power levels received on downlink radio channels in the mobile stations are measured. The estimated percentile value $\hat{G}^r_{ax,t}$ of the amplification factors of combinations of those base station pairs BSa to which the receivers belong and the base stations BSx to which the transmitters belong is then generated. A mean value is formed of the observations of the percentile values relating to the same base station pair. More observations are obtained when measurements are also made in downlink, resulting in more reliable estimated percentile values.

When measurements are made for all uplink and/or downlink radio channels, or for a subset of radio channels in the radio communications system, the amplification element matrix will contain a mean value of the percentile values of the amplification factors of all combinations of base station pairs.

FIG. 4 shows an example of the configuration of an amplification element matrix. This matrix contains an estimated percentile value $\hat{G}^r_{ax,t}$, x,a∈X, X=1 . . . n, for each combination of base station pairs BSa–BSx.

The majority of radio communications systems include both uplink and downlink radio channels. However, radio communications systems exist in which a connection solely includes radio channels in one direction. For instance, some paging systems transmit signals only in downlink. This means that measurements can be made solely in downlink.

Consequently, the method results in the generation of an estimated statistical value, in the present case a percentile value $\hat{G}^r_{ax,t}$ of the amplification factor of each combination of base station pairs BSa–BSx. This means that the amplification factor values in respect of 100*r % of the connections between mobile stations that belong to a certain base station BSa and to another base station BSx will lie beneath the estimated percentile value $\hat{G}^r_{ax,t}$.

Generation of the amplification factors in accordance with the invention for each transmitter/receiver combination that uses the same radio channel (step 305 in FIG. 3) will now be described in more detail. As is known, a recursive algorithm generates a value at a given time point, here given with a time index t+1, as a function of a value at an earlier time point, here given with a time index t. A certain period of time has passed between two mutually sequential time indexes. Iteration of a recursive algorithm is initiated by determining the start values at time index t=0. These values can be obtained randomly or determined in some other way.

The method described below is based on measuring the received power level $s_{xy,t}$ on a radio channel chy in a receiver in a base station BSx. The power levels transmitted from the transmitters in mobile stations that transmit on the radio channel chy concerned are assumed to be stored in a power level vector $P_{y,t}$. A power level vector $P_{1,t}=(p_{11,t}, p_{31,t}, p_{51,t})$ is then obtained for radio channel ch1 in the embodiment earlier described with reference to FIG. 2.

In the illustrated case, the percentile values for the amplification factors pertaining to a base station BSx and a radio channel chy may be stored in an amplification element vector $V_{xy,t}$. An amplification element vector $V_{xy,t}=(\hat{G}^r_{11,t},\hat{G}^r_{21,t},\hat{G}^r_{31,t})$ is then obtained for radio channel ch1 in the embodiment earlier described with reference to FIG. 2.

Using the earlier mentioned designations, a recursive algorithm for estimating an amplification element vector in accordance with the above can be expressed generally as:

$$V_{xy,t+1}=f(V_{xy,t}, P_{y,t}, s_{xy,t})$$

The amplification element vector $V_{xy,t+1}$ obtained at time index t+1 is hereinafter designated the secondary amplification element vector that includes secondary amplification elements. An amplification element consists of a percentile value of the amplification vector. The amplification element vector $V_{xy,t}$ obtained at the time point of time index t is hereinafter designated the primary amplification element vector, which includes primary amplification elements. The secondary amplification element vector is therewith a function of the primary amplification element vector $V_{xy,t01}=f(V_{xy,t}, P_{y,t}, s_{xy,t})$.

One example of a recursive algorithm that gives the mean value of path loss, or attenuation, between each base station is the so-called least mean square algorithm. This algorithm is known and has the following appearance in the present case:

$$V_{xy,t+1}=V_{xy,t}+\mu P_{y,t}(s_{xy,t}-P_{y,t}V_{xy,t}) \quad (1)$$

where $s_{xy,t}-P_{y,t}V_{xy,t}$ gives the error between the estimated received power level on a radio channel and the power level that should have been received on said channel if the amplification factors had assumed the amplification element stored in the vector $V_{xy,t}$. This error, which can also be considered as a stochastic variable, is hereinafter designated $\epsilon_{xy,t}$. The value $\mu$ influences the convergence rate, i.e. the rate at which the algorithm is stabilized. This algorithm has a linear updating rule, meaning that the change between a secondary and a primary amplification element will depend linearly on the error $\epsilon_{xy,t}$.

It is not desirable to take account of the mean value of the amplification factors when practicing the present invention. As earlier mentioned, it is the probability of an amplification factor lying below a certain value that is estimated. This is expressed by the percentile values in the present embodiment.

The appearance of the distribution functions of the amplification factors is not known. However, the percentile values can be estimated with the aid of the inventive recursive algorithm described below, where input data is the measured values of received power levels on respective radio channels, and the power levels transmitted on respective radio channels.

The recursive algorithm is commenced by determining a start vector $V_{yx,0}$ at time index t=0, this start vector including the start values of the percentile values of the amplification factors of those base station combinations to which mobile stations that transmit on radio channel chy belong and base station BSx in which the received power level $s_{xy,t}$ is measured. These start values may be random values or mean values that have been estimated with the aid of the above LMS algorithm. The LMS algorithm has, in turn, been started with some type of start values.

In the algorithm structure used in the inventive method, the secondary amplification element vector is dependent on the earlier mentioned error $\epsilon_{xy,t}=s_{xy,t}-P_{y,t}V_{xy,t}$, as in the LMS algorithm. On the other hand, the change between a primary and a secondary amplification element vector in an iteration step according to the inventive method is not linearly dependent on the error $\epsilon_{xy,t}$, but is asymmetrically non-linearly dependent on the error.

The difference between the secondary and the primary amplification elements $\hat{G}^r_{ax,t+1}-\hat{G}^r_{ax,t}$ is dependent on the magnitude of the primary amplification elements. In other words, the primary amplification elements in the primary amplification element vector $V_{xy,t}$ are multiplied individually by the other terms in the recursive algorithm.

In a first embodiment, the change between the primary amplification elements $\hat{G}^r_{ax,t}$ and the secondary amplification elements $\hat{G}^r_{ax,t+1}$ in an iteration step takes different constant values depending on whether the error $\epsilon_{xy,t}$ is positive or negative. In the present case, the recursive algorithm has the following structure:

$$V_{xy,t+1}=V_{xy,t}(1+P_{y,t}f(\epsilon_{xy,t})) \quad (2)$$

where 1 is a unit vector that includes the same number of elements as the number of transmitters that transmit on the radio channel concerned, and where · means multiplication of individual elements, i.e. the first primary amplification element in the amplification element vector $V_{xy,t}$ is multiplied by the first element in the vector that is formed by the expression within parenthesis, and so on.

The function f(εxy,t) takes a constant positive value for all positive $\epsilon_{xy,t}$, and a constant negative value for all negative $\epsilon_{xy,t}$. The constant values are contingent on the percentile r and on the value of the convergence rate μ in accordance with:

$$f(\varepsilon_{xy,t}) = \begin{cases} \mu\sqrt{\dfrac{r}{1-r}}, & \varepsilon_{xy,t} > 0 \\ -\mu\sqrt{\dfrac{1-r}{r}}, & \varepsilon_{xy,t} < 0 \end{cases}$$

where r takes values between 0 and 1, as in the earlier case. The percentile r and the convergence rate p are determined prior to commencing the method.

The change between two iterations is therewith asymmetrical, depending on whether the error is positive or negative. The ratio between the value of the function $f(\epsilon_{xy,t})$ when $\epsilon_{xy,t}$ is greater than zero or smaller than zero becomes the factor r/(1−r). When r is greater than 0.5, the algorithm takes larger steps between two iterations for positive error values than for negative error values, i.e. the function is asymmetrical.

Figure 5:
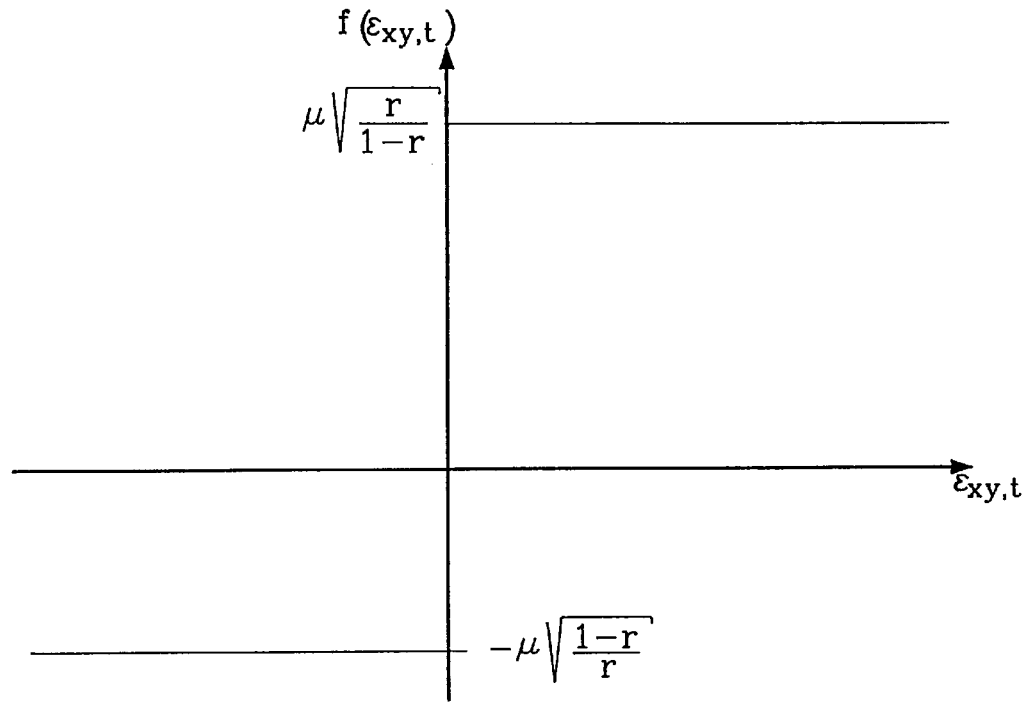
FIG. 5 is a graph illustrating a function $f(\epsilon_{xy,t})$ according to one embodiment of the inventive method.

FIG. 5 is a graph of $f(\epsilon_{xy,t})$ as a function of $\epsilon_{xy,t}$ in accordance with the described embodiment. The graph is plotted for an r value that is greater than 0.5, wherewith $f(\epsilon_{xy,t})$ takes larger values for positive values of $\epsilon_{xy,t}$ than for negative values.

The case when the percentile is chosen as r=0.9 can be taken by way of example. In the case of positive error values, the value of the function $f(\epsilon_{xy,t})$ will be nine times greater than the negative error values. The change from a primary amplification element that is found to be too small to a secondary amplification element is thus nine times greater than the change of an amplification element that is found to be too large. In the illustrated embodiment, the algorithm will converge essentially towards the 90% percentile value for respective amplification elements. This means that substantially 90% of the observations of the amplification factor of combinations of base station pairs will lie beneath the level of the estimated percentile value.

Figure 6:
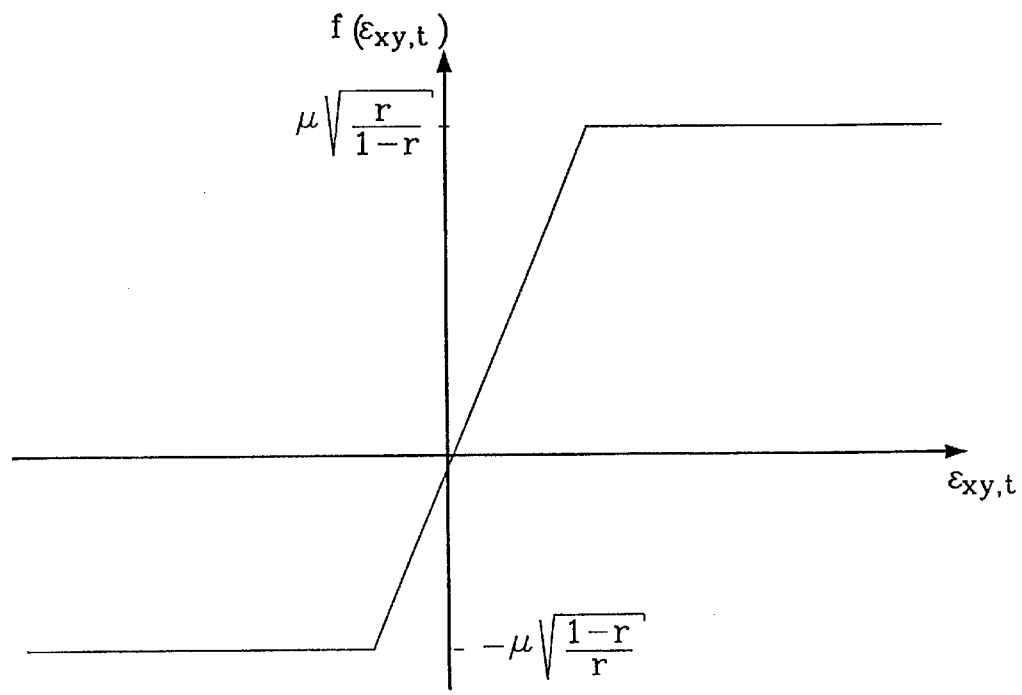
FIG. 6 shows a graph of a function $f(\epsilon_{xy,t})$ according to one embodiment of the inventive method.

FIG. 6 is a graph of the function $f(\epsilon_{xy,t})$ as a function of $\epsilon_{xy,t}$ in accordance with an alternative embodiment of the inventive method. The magnitude of the error $\epsilon_{xy,t}$ is also taken into account in this case, and not only its sign. In the case of large deviations from $\epsilon_{xy,t}=0$, the function has the same appearance as in the case earlier described with reference to FIG. 5. In the case of small deviations from $\epsilon_{xy,t}=0$, the function is a linear function $f(\epsilon_{xy,t})=k\epsilon_{xy,t}$, where k is a constant.

The function $f(\epsilon_{xy,t})$ need not have precisely the appearance shown in FIGS. 5 and 6. There exist many other functions that will behave similarly to these functions, such as tanh-(tangens hyperbolicus) functions and certain polynomial functions.

Figure 7:
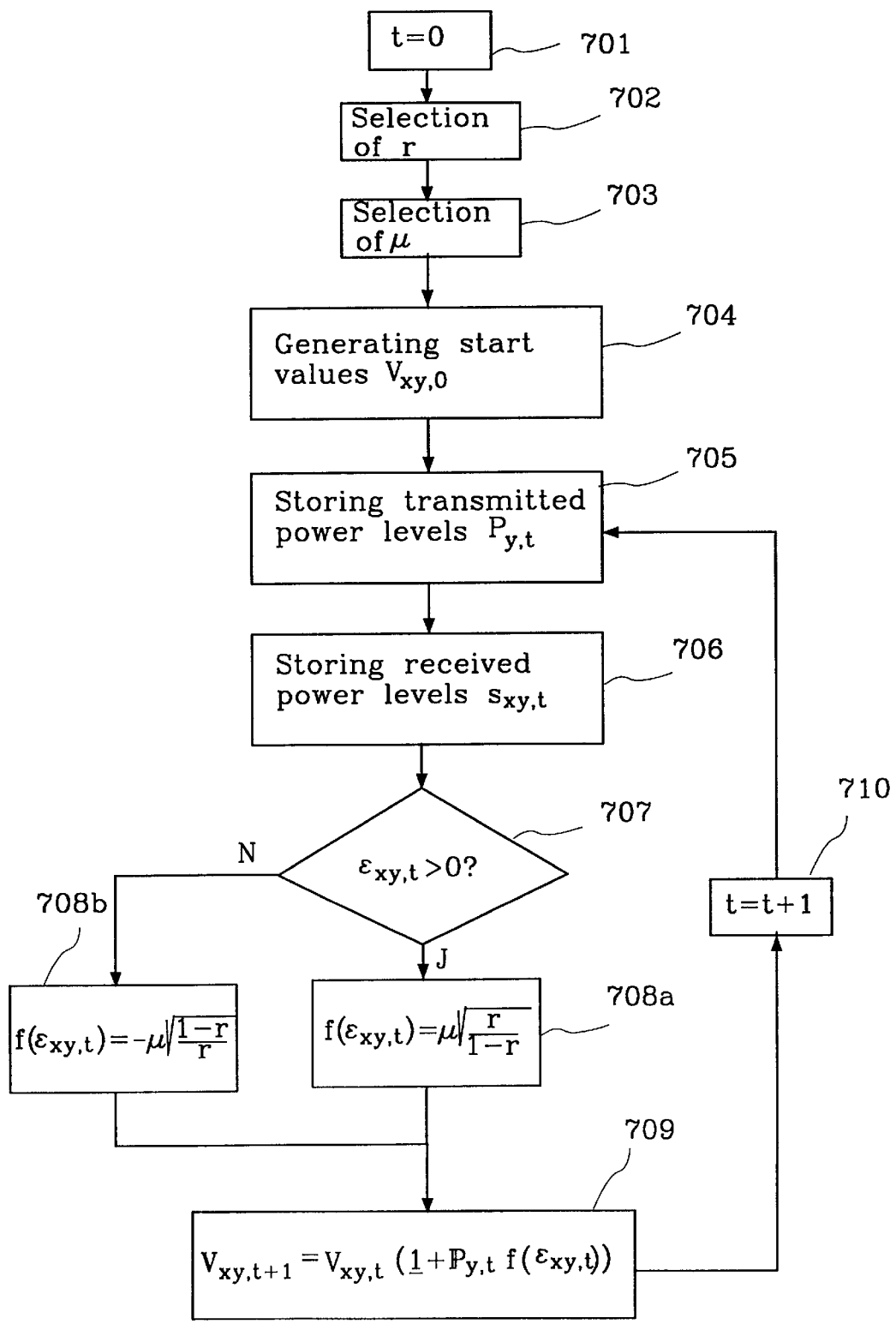
FIG. 7 is a flowchart that illustrates part of the inventive method.

FIG. 7 is a flowchart illustrating the recursive generation of estimated percentile values of amplification factors of pair-wise combinations of transmitters that transmit on a given radio channel chy and a receiver that receives power level on said radio channel chy (step 305 in FIG. 3). The function $f(\epsilon_{xy,t})$ described with reference to FIG. 5 is used in this embodiment.

The method is commenced at step 701, the time index being t=0.

A value of the percentile r is chosen in step 702.

A value of a convergence factor μ is chosen in step 703.

The start vector $V_{xy,0}$ containing guessed or estimated start values of the percentile values $\hat{G}^r_{ax,0}$ of the amplification factors of pair-wise combinations of those base stations BSa to which the transmitter belong and the base station BSx to which the receiver belongs is generated in step 704. The values contained in the start vector will form said primary amplification element vector $V_{xy,t}$ in the first iteration step.

The transmitted power levels $p_{iy,t}$ from each of the transmitters that transmit on the radio channel concerned are stored in said power level vector $P_{y,t}$ in step 705.

The total power level received $s_{xy,t}$ on the radio channel chy concerned is stored in the receiver in step 706.

In step 707, a check is made to ascertain whether or not the error $\epsilon_{xy,t}=s_{xy,t}-P_{y,t}V_{xy,t}$, i.e. the difference between the measured power level $s_{xy,t}$ and the scalar product $P_{y,t}V_{xy,t}$ of the power level vector $P_{y,t}$ and the primary amplification element vector $V_{xy,t}$, which is the start vector $V_{xy,o}$ at the first iteration, is greater than zero.

If such is the case (Yes in step 707), the aforesaid non-linear function $f(\epsilon_{xy,t})$ in step 708a will be equal to:

$$f(\varepsilon_{xy,t}) = \mu\sqrt{\dfrac{r}{1-r}}$$

If such is not the case (No in step 707), the non-linear function $f(\epsilon_{xy,t})$ in step 708b will be equal to:

$$f(\varepsilon_{xy,t}) = -\mu\sqrt{\dfrac{1-r}{r}}$$

The aforesaid secondary amplification elements are generated in step 709 in dependence on the primary amplification elements according to the formula:

$$V_{xy,t+1}=V_{xy,t}(1+P_{y,t}f(\varepsilon_{xy,t}))$$

The time index is increased to t=t+1 in step 710, and the method is thereafter repeated from step 705.

The algorithm will stabilize after a sufficiently long time has passed. Iteration, however, can carry-on continuously in the radio communications system, wherewith the generated amplification element vector $V_{xy,t}$ is constantly changed.

It is also possible that continuous updating of the amplification element matrix is undesirable. For instance, it is conceivable that the operator himself/herself will determine when the iteration shall be in progress or that the iteration will be implemented at certain time intervals determined by the system. In an alternative embodiment of the inventive method, the percentile values of the amplification factor have been given a maximum value $\hat{G}^r_{max}$ and a minimum value $\hat{G}^r_{min}y$. Should the secondary amplification element exceed the maximum value, said element is set to the maximum value. Similarly, the secondary amplification element is set to the minimum value should said element lie below the minimum value. Extremity values are removed in this way, therewith enabling the algorithm to stabilize more quickly.

The inventive method has been described with reference to the case where only one single value of the percentile r is used. However, it is, of course, possible to repeat the method for different values of the percentile r, therewith to obtain estimated distribution functions for the amplification factors of respective base station combinations.

Figure 8:
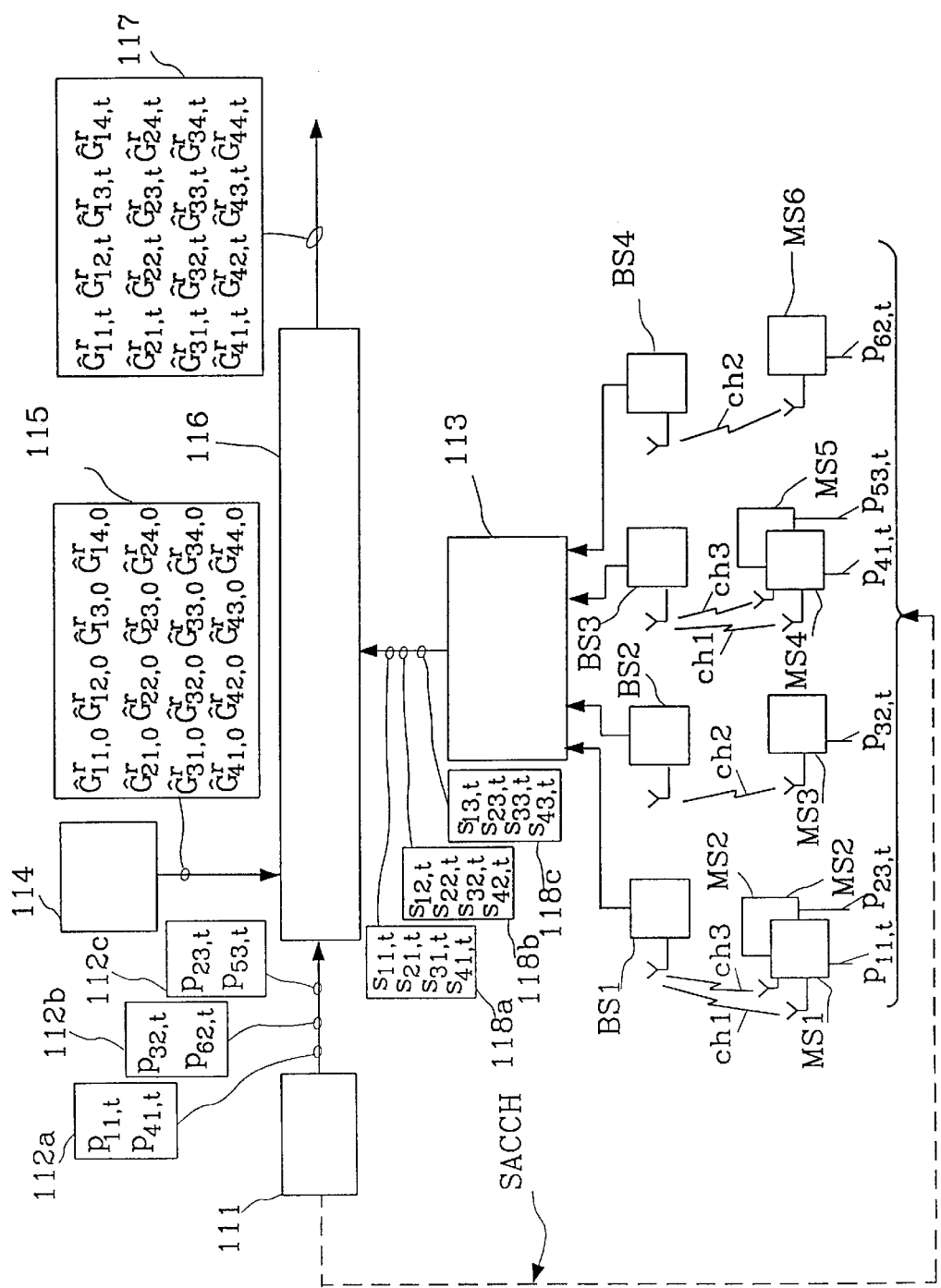
FIG. 8 is a simplified block schematic illustrating apparatus implemented in part of the radio communications system in accordance with the invention.

FIG. 8 is a simplified illustration of inventive apparatus included in a radio communications system. The radio communications system includes in the illustrated case four base stations BS1–BS4 and six mobile stations MS1–MS6. The mobile stations MS1 and MS2 belong to the base station BS1, the mobile station MS3 belongs to the base station BS2, the mobile stations MS4 and MS5 belong to the base station BS3 and the mobile station MS6 belongs to the base station BS4. The mobile stations MS1 and MS4 transmit on radio channel ch1, the mobile stations MS3 and MS6 transmit on radio channel ch2, and the mobile stations MS2 and MS5 transmit on radio channel ch3.

The same designations relating to determined and measured power levels and estimated percentile values for amplification factors as those used earlier are used in the continued description of the inventive apparatus.

The power levels $p_{11,t}$, $p_{23,t}$, $p_{32,t}$, $p_{41,t}$, $p_{53,t}$ and $p_{62,t}$ transmitted from the transmitters in the mobile stations MS1–MS6 are determined continually by a power level determining device 111. This device 111 stores the transmitted power levels channel-wise and information with respect to which base station or mobile station belongs in a first transmitter power level list 112a for radio channel ch1, a second transmitter power level list 112b for radio channel ch2, and a third transmitter power level list 112c for radio channel ch3.

The mobile stations MS1–MS6 receive messages informing of the power level to be transmitted by said stations and the radio channel that they shall use via some control channel, e.g. SACCH. This is indicated in the Figure with a broken line extending from the power level determining device 111 to respective mobile stations MS1–MS6. Naturally, the base stations may also be informed as to which power levels they shall transmit and which channels they shall use, although this has not been shown in the Figure.

A start value generating device 114 generates a start matrix 115 that includes the start percentile values $\hat{G}^r_{11,0}$, $\hat{G}^r_{21,0}$, $\hat{G}^r_{31,0}$, $\hat{G}^r_{41,0}$, $\hat{G}^r_{12,0}$ and so on, for amplification factors of the combinations of base station pairs BS1–BS4. This can take place by some form of more or less qualified guess work. For instance, the first mean values of the amplification factors can be estimated in accordance with the earlier described LMS algorithm, and these values then used as start values.

In the present example, there are first measured the power levels received in each base station BS1–BS4 on the radio channel ch1, whereafter the method is repeated for channels ch2 and ch3.

Those power levels $s_{11,t}$, $s_{21,t}$, $s_{31,t}$ and $s_{41,t}$ that are received on radio channel ch1 in respective base stations BS1–BS4 are measured and stored in a first receiver power level list 118a by a power level measuring device 113. The first transmitter power level list 112a, the start matrix 115, and the first receiver power level list 118a are input data to a device 116 for generating an amplification element matrix. This device is described in more detail below with reference to FIG. 9.

Solely those start values that apply to the combinations of base station pairs to which the transmitters belong and the base station pairs to which the receivers belong are used in the generation of said amplification element matrix.

The device 116 generates an amplification matrix 117 that includes estimated percentile values for amplification factors of all pair-wise combinations of the base stations to which the transmitters belong and the base stations to which the receivers belong, with the aid of the earlier described recursive method.

Those transmitters that transmit on radio channel ch1 are included in the mobile stations MS1 and MS4 that belong to the respective base stations BS1 and BS3. The receivers in which the power levels are measured are included in the base stations BS1–BS4. Thus, when measuring on radio channel ch1, the following estimated percentile values $\hat{G}^r_{11,t}$, $\hat{G}^r_{12,t}$, $\hat{G}^r_{13,t}$, $\hat{G}^r_{14,t}$, $\hat{G}^r_{31,t}$, $\hat{G}^r_{32,t}$, $\hat{G}^r_{33,t}$, $\hat{G}^r_{34,t}$, are generated and stored in the amplification element matrix 117.

When measuring on a channel is completed, in the illustrated case on channel ch1, the newly generated percentile values may then replace corresponding start values in the start matrix 115, therewith updating the start matrix with better start values.

The procedure is then repeated for radio channel ch2. The power levels for the mobile stations MS3 and MS6 that transmit on radio channel ch2 are determined by the power level determining device 111.

Those power levels $s_{12,t}$, $s_{22,t}$, $s_{32,t}$, $s_{42,t}$ received in receivers included in the base stations BS1–BS4 on radio channel ch2 are measured and stored by the power level measuring device 113 in a second receiver power level list 118b.

The second receiver power level list 118b, the second transmitter power level list 112b and the start matrix 115 are input data to the device 116 for generating an amplification element matrix. In the same way as for radio channel ch1, the device 116 generates an amplification element matrix 117 that includes estimated percentile values for amplification factors of all pair-wise combinations of those base stations to which the transmitters belong and those base stations to which the receivers belong.

Those transmitters that transmit on radio channel ch2 are included in the mobile stations MS3 and MS6 that belong to the base stations BS2 and BS4 respectively. The receivers in which the power levels are measured are included in the base stations BS1–BS4. Thus, when measuring on radio channel ch2, the following estimated percentile values $\hat{G}^r_{21,t}$, $\hat{G}^r_{22,t}$, $\hat{G}^r_{23,t}$, $\hat{G}^r_{24,t}$, $\hat{G}^r_{41,t}$, $\hat{G}^r_{42,t}$, $\hat{G}^r_{43,t}$, $\hat{G}^r_{44,t}$ are generated and stored in the amplification element matrix 117.

The amplification element matrix therewith includes a generated percentile value for each matrix element.

The procedure is then repeated for radio channel ch3. The power levels of those mobile stations MS2 and MS5 that transmit on radio channel ch3 are determined by the power level determining device 111.

The power levels $s_{13,t}$, $s_{23,t}$, $s_{33,t}$, $s_{43,t}$ that are received in receivers included in the base stations BS1–BS4 on radio channel ch3 are measured and stored by the power level measuring device 113 in a third receiver power level list 118c.

The third receiver power level list 118c, the third transmitter power level list 112c and the start matrix 115 are used as input data to the device 116 for generating an amplification element matrix. The start matrix now includes the same values as the latest version of the attenuation element matrix 117. The device 116 for generating an amplification element matrix generates estimated percentile values for amplification factors of all combinations of those base station pairs to which the transmitters belong and those base station pairs to which the receivers belong, in the same manner as that described with reference to radio channel ch1 and ch2.

The transmitters that transmit on radio channel ch3 are included in the mobile stations MS2 and MS5 that belong to the base stations BS1 and BS3 respectively. The receivers in which the power levels are measured are included in the base stations BS1–BS4. Thus, the following percentile values are estimated when measuring on radio channel ch3:

$\hat{G}^r_{11,t}, \hat{G}^r_{12,t}, \hat{G}^r_{13,t}, \hat{G}^r_{14,t}, \hat{G}^r_{31,t}, \hat{G}^r_{32,t}, \hat{G}^r_{33,t}, \hat{G}^r_{34,t} \ldots$ These observations are percentile values for the same combinations of base stations as those generated when measuring on radio channel ch1. Corresponding matrix elements have therewith been updated once.

In another embodiment of the inventive method, power levels of all channels ch1–ch3 are measured simultaneously. This means that several observations of percentile values for amplification factors of the same pairs of base stations are obtained at one and the same time. Observations concerning the same base station pairs can then be combined in some form of a weighted or non-weighted mean value structure.

When all channels have been measured, or a predetermined subset of said channels have been measured, and the percentile values generated, the procedure can then be repeated either continually or at given time intervals, therewith constantly updating the amplification element matrix.

Apparatus for a simplified radio communications system have been described in the aforegoing. A typical radio communications system will include more than four base stations and more than six mobile stations. The power level determining device 111 and the power level measuring device 113 may be included in a base station controller BSC. A radio communications system will normally include several base station controllers, each including a power level determining device and a power level measuring device for those transmitters and receivers that belong to base stations that are connected to this base station controller. The device 114 for generating start values and the device 116 for generating an amplification element matrix may be included in a mobile services switching centre MSC.

The system may include more than one mobile switching centre MSC, these switching centres generating together a common amplification element matrix. For instance, an amplification element matrix may be generated in respective mobile switching centres MSC, these matrices being combined to form an amplification element matrix that applies to the entire radio communications system, by means of some suitable external means.

Figure 9:
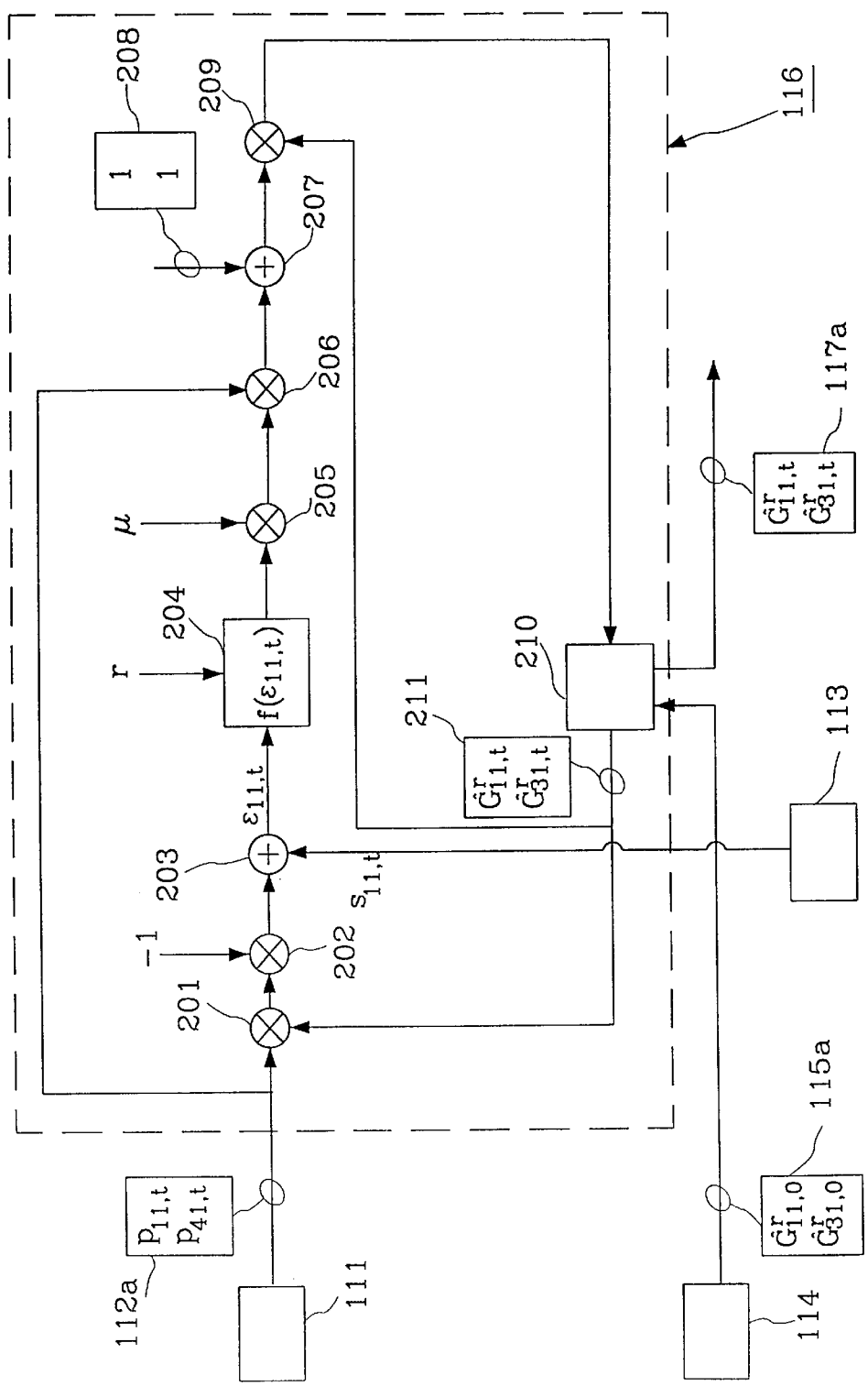
FIG. 9 is a more detailed view of means for generating an amplification element matrix included in apparatus according to the invention.

FIG. 9 is a more detailed illustration of the device 116 for generating an amplification element matrix. Other devices that are illustrated in FIG. 11 have the same reference signs as those in FIG. 8. The device 116 is shown solely in respect of that case when the first transmitter power level list 112a and a power level $s_{11,t}$ received and measured? in the base station BS1 constitute input data. The transmitters belong to the base stations BS1 and BS3 in the illustrated example. Solely those matrix elements $\hat{G}^r_{11,0}$ and $\hat{G}^r_{31,0}$ in the start matrix that denote the start values of the percentile values for amplification factors of the base station combinations BS1, BS2 and BS3 BS4 are used. These values can conceivably be stored in a start list 115a.

The device 116 for generating an amplification element matrix includes means that execute the recursive algorithm described above with reference to FIGS. 5–7. A memory device 210 stores current, estimated percentile values $\hat{G}^r_{11,0}$ and $\hat{G}^r_{31,0}$ of the amplification factor of the aforesaid combinations of base station pairs in a primary amplification element list 211. In the illustrated case, the primary amplification element list 211 includes a primary amplification element for the combinations of base station pairs BS1, BS1 and BS1, BS3. The time index t is set to zero when iteration shall commence, wherewith the values in the start list 115a constitute the primary amplification elements.

The memory storage device 210 distributes to a multiplier 201 first the primary amplification elements in the primary amplification element list. The primary amplification elements are scalar-multiplied by the power level values in the transmitter power level list 112a. The resultant scalar product $\hat{G}^r_{11,0}p_{11,t} + \hat{G}^r_{31,0}p_{41,t}$ is multiplied by a factor −1 in a multiplier 212. The negative scalar product $-(\hat{G}^r_{11,0}p_{11,t} + \hat{G}^r_{31,0}p_{41,t})$ is added in an adder 203 to the measured value of the received power level $s_{11,t}$ on radio channel ch1 in the base station BS1. The error $\epsilon_{11,t} = s_{11,t} - (\hat{G}^r_{11,0}p_{11,t} + \hat{G}^r_{31,0}p_{41,t})$ between the power level that should have been received if the amplification factors were equal to the primary amplification elements, and the power level $s_{11,t}$ actually received on radio channel ch1 in the base station BS1 has thus been generated.

Two different constant values are generated in a function device 204, these values being dependent on whether the error $\epsilon_{11,t}$ is positive or negative. The constant values are determined by a predetermined percentile r. The value $$\sqrt{\frac{r}{1-r}}$$

is generated when the error is positive, whereas the value $$\sqrt{\frac{1-r}{r}}$$

is generated when the error is negative. The generated value is multiplied in a multiplier 205 by a predetermined constant $\mu$ that influences the iteration convergence rate. The function $f(\epsilon_{11,t})$ mentioned above with reference to FIGS. 3–7 has therewith been generated.

Each power level element $p_{11,t}$ and $p_{41,t}$ in the transmitter power level list is multiplied by the value of the function $f(\epsilon_{11,t})$ in a multiplier 206. The value 1 is added to each element in an adder 207, the result being $(1,1)+(p_{11,t},p_{41,t})f(\epsilon_{11,t})$.

The values obtained are then multiplied element-wise in a multiplier 209 by a respective primary amplification element in the primary amplification element list 211, wherewith the first element generated is $\hat{G}^r_{11,t}(1+p^{11,t}f(\epsilon_{11,t}))$ and so on. The values thus obtained are called secondary amplification elements. The secondary amplification elements are stored in the storage device 210 as new primary amplification elements in the primary list 211, these values passing through the same devices 201–209 in the next iteration step. The storage device 210 stores the values in the latest updated primary amplification element list 211 in correct positions in the amplification element matrix 117. FIG. 9, however, shows these values as though they were stored in an amplification element list 117a.

In the illustrated embodiment, a value $\hat{G}^r_{11,t}$ for the percentile value of the amplification factor of the base station combination BS1-BS1 and a value $\hat{G}^r_{31,t}$ for the combination BS3-BS1 has therewith been generated and stored in the amplification element matrix 117.

For the sake of simplicity, FIG. 9 shows how the device 116 for generating an amplification element matrix is constructed for the case when a receiver measures the power level on a radio channel. Since power level measurements for each radio channel are carried out in all, or a subset, of the base stations in the radio communications system, said device 116 will include a set of the aforesaid devices 201–211 for each base station.

The base stations that carry out the measuring processes are then assumed to include receivers that are able to measure on all uplink radio channels in the radio communications system. It may be desirable for the base stations to include a separate measuring receiver to this end.

As before mentioned, the received power level on downlink radio channels may, of course, be measured in each mobile station and processed in the same way as in the uplink case. This gives further observations and therewith enhances the reliability of the amplification element matrix.

When measurements are also made on downlink radio channels in receivers in mobile stations, the device 116 for generating an amplification element matrix will include as many sets of devices 201–211 as the number of mobile stations that measure power levels. In this case, the mobile stations that measure power levels are assumed to include receivers that are able to measure power levels on all downlink radio channels in the radio communications system. It may be desirable for the mobile stations to include a separate measuring receiver to this end.

An example of how the amplification element matrix that is generated with the aid of the inventive apparatus and inventive method can be used is found in the installation of a new base station. Radio channels must be allocated before this new base station can be taken into operation. The present example assumes that there exists an amplification element matrix for the existing radio communications system. The matrix is constructed in accordance with the description of FIG. 4.

This matrix must be extended with a row and a column that include estimated statistical amplification factors for all combinations of the new base station and existing base stations. In order to generate the row that is missing from the existing matrix, it would be necessary for connections to have been already established between mobile stations and the new base station, which is not the case. However, a column can be generated in the matrix prior to the new base station becoming operative.

This is achieved by allowing the new base station to listen on all uplink radio channels in the radio communications system and measuring the power level received on respective radio channels. The inventive recursive method is then applied to generate the percentile values for the amplification factors of each combination of the existing base stations and the new base station.

The amplification element matrix is extended by a new column in this way. With knowledge of those amplification factors that are found with combinations of different base stations and the new base station about to be installed, and by knowing which mobile stations that transmit signals on which radio channels, the transmitted power levels, and the base station identity of the mobile stations, it is readily easy to estimate the interference level that is likely to be experienced by a connection to the novel base station that utilizes one of said radio channels. Radio channels that are used by base stations in relation to which the new base station has a low amplification factor may be allocated appropriately to this new base station, for instance.

The interference that would be introduced on other base stations existing connections that use this radio channel can also be estimated. This estimation can be made by using the values in the generated row. These values relate to actual path loss between mobile stations belonging to the existing base stations and the new base stations, and not the other way around. However, these values can also be used to obtain a rough estimation of expected signal contributions from signals between mobile stations that belong to the new base station and remaining base stations on different radio channels.

The allocation of radio channels to the new base station can be optimized so as to obtain low interference on the own connections, while ensuring that the connections of other base stations will not experience high interference.

The aforedescribed method can also be applied when a base station is moved within a radio communications system or shall be allocated new channels.

A call setup is another example the use to which the invention can be put. By knowing which radio channels are used by which mobile stations, base station membership, and transmitted power levels, it is possible to estimate interference of any connections that may be set up on different radio channels. Similarly to what has been described above, there can be selected a radio channel which is estimated to subject the newly established connection with solely low interference, while preferably not introducing too much interference in respect of any other connection.

Another example of the field of use of the invention is the study of the affect between microcells and superimposed macrocells. A further use to which the amplification factors can be put is in the power level control of the radio communications system such as to enable optimal power levels to be estimated. Another application is in determining which base stations are the neighbours of other base stations, i.e. those base stations which disturb one another most. Naturally, the invention can be applied in many other contexts.

What is claimed is:

1. A method of estimating a statistical measurement of the path loss in a radio communications system that includes at least one primary radio station and at least one secondary radio station (MS1–MS6), said primary and secondary radio stations including transmitters and receivers that communicate with one another over downlink radio channels in a direction from the primary stations to the secondary radio stations, and over uplink radio channels in a direction from the secondary radio stations to the primary radio stations, wherewith respective pairs of uplink and downlink radio channels form a connection between a primary and a secondary radio station, and wherewith the connections are subjected to path loss and interference, the method comprising the steps of:

a) selecting at least one of the radio channels;
   b) determining the power levels ($p_{iy,t}$) transmitted from those transmitters that transmit on the radio channel;
   c) measuring the power level ($s_{xy,t}$) received on the radio channel in a plurality of receivers;
   d) identifying the primary radio stations to which the transmitters and the receivers belong;
   e) generating an estimated value of a statistical measurement ($G^r_{ax,t}$) of a stochastically distributed amplification factor ($G_{ax,t}$) for each pair-wise combination of the transmitters and the receivers in dependence on the transmitted power levels ($p_{iy,t}$) determined in b) and the power levels ($s_{xy,t}$) measured in c), the respective values being stored as an observation of the statistical measurement of the amplification factor ($\hat{G}^r_{ax,t}$; $0 < \hat{G}^r_{ax,t} < 1$) of pair-wise combinations of primary radio stations.

2. A method according to claim 1 in which the method steps a–e are repeated continually in the radiocommunications system.

3. A method according to claim 1, in which uplink radio channels and downlink radio channels are both selected, and in which the values of the statistical measurement of amplification factors based on power level measurements on an uplink radio channel and on a downlink radio channel that constitute a connection are considered to constitute two different observations of the same amplification factor.

4. A method according to claim 1, in which solely downlink radio channels are chosen.

5. A method according to claim 1, in which solely uplink radio channels are chosen.

6. A method of estimating a statistical measurement of the path loss in a radio communications system that includes at least one primary radio station and at least one secondary radio station, the primary radio stations including at least one transmitter and the secondary radio stations including at least one receiver, and the transmitter and receiver communicating mutually over connections that use radio channels, the connections being subjected to path loss and interference, the method comprising the steps of:
   a) selecting at least one of the radio channels;
   b) determining the power levels transmitted from those transmitters that send signals on the radio channel;
   c) measuring the power level ($s_{xy,t}$) received on the radio channel in at least one receiver;
   d) identifying the primary radio stations to which the transmitter and the receiver belong; and
   e) generating an estimated value of a statistical measurement ($G^r_{ax,t}$) of a stochastically distributed amplification factor ($G_{ax,t}$) for each pair-wise transmitter and receiver combination in dependence on the transmitted power levels ($p_{iy,t}$) and on the measured power levels ($s_{xy,t}$), wherewith respective values are stored as an observation of the statistical measurement of the amplification factor ($\hat{G}^r_{ax,t}$; $0 < \hat{G}^r_{ax,t} < 1$) of pair-wise combinations of primary radio stations.

7. A method according to claim 6, in which the method steps a–e are repeated continually in the radio communications system.

8. A method of estimating a statistical measurement of the path loss in a radio communications system that includes at least one primary radio station and at least one secondary radio station, the primary radio stations including at least one receiver and the secondary radio stations including at least one transmitter, the transmitter and receiver communicating mutually over connections that use radio channels, the connections being subjected to path loss and interference, the method comprising the steps of:
   a) selecting at least one of the radio channels;
   b) determining the power levels $p_{iy,t}$ transmitted from those transmitters that send signals on the radio channel;
   c) measuring the power level ($s_{xy,t}$) received on the radio channel in at least one receiver;
   d) identifying the primary radio stations to which the transmitter and the receiver belong; and
   e) generating an estimated value of a statistical measurement ($G^r_{ax,t}$) of a stochastically distributed amplification factor ($G_{ax,t}$) for each pair-wise transmitter and receiver combination in dependence on the transmitted power levels ($p_{iy,t}$) and the measured power levels ($s_{xy,t}$), respective values being stored as an observation of the statistical measurement of the amplification factor ($\hat{G}^r_{ax,t}$; $0 < \hat{G}^r_{ax,t} < 1$) of pair-wise combinations of primary radio stations.

9. A method according to claim 8, in which the method steps a–e are repeated continually in the radio communications system.

10. A method according to claim 1, in which the statistical measurements are percentile values ($\hat{G}^r_{ax,t}$), where the percentile (r) can take values between 0 and 1.

11. A method according to claim 10, wherein an estimated value of a statistical measurement of a stochastically distributed amplification factor ($\hat{G}^r_{ax,t}$) is generated for each of pair-wise combinations of a plurality of transmitters and a receiver and wherein the method further comprises the steps of:
   a) selecting a value of a percentile (r);
   b) selecting a value of a convergence factor ($\mu$);
   c) generating start values ($\hat{G}^r_{ax,0}$) of the statistical measurement of respective transmitters and the receiver; and
   d) generating recursively secondary amplification elements ($\hat{G}^r_{ax,t+1}$) for respective combinations of the transmitters and the receiver, the elements being stored in a secondary amplification element vector ($V_{xy,t+1}$) as functions of primary amplification elements ($\hat{G}^r_{ax,t}$), stored in a primary amplification element vector ($V_{xy,t}$), the primary amplification vector being initiated with the start values, wherein a difference between a secondary amplification element and a primary amplification element is asymmetrically non-linearly dependent on the error ($\epsilon_{xy,t} = s_{xy,t} - P_{y,t} V_{xy,t}$) that occurs between the power level ($s_{xy,t}$) on the radio channel measured in the receiver and the power level ($P_{y,t} V_{xy,t}$) that would have been received by the receiver on the radio channel if the amplification factors ($G_{ax}$) were equally as large as the primary amplification elements ($\hat{G}^r_{ax,t}$).

12. A method according to claim 11, wherein a difference between the secondary amplification elements ($\hat{G}^r_{ax,t+1}$) and the primary amplification elements ($\hat{G}^r_{ax,t}$) between two iteration steps is asymmetrically dependent on whether an error ($\epsilon_{xy,t}$) is positive or negative and independent of the magnitude of the error.

13. A method according to claim 5, wherein a difference between secondary amplification elements ($\hat{G}^r_{ax,t+1}$) and primary amplification elements ($\hat{G}^r_{ax,t}$) between two iteration steps is asymmetrically dependent on whether an error ($\epsilon_{xy,t}$) is positive or negative and is also dependent on the magnitude of the error.

14. A method according to claim 12, wherein the percentile (r) is greater than 0.5.

15. A method according to claim 14, wherein the difference between the secondary amplification elements ($\hat{G}^r_{ax,t+1}$) and the primary amplification elements ($\hat{G}^r_{ax,t}$) between two iteration steps is greater for positive values of the error ($\epsilon_{xy,t}$) than for negative values of the error, and wherein this difference is contingent on the value of the percentile (r) and on the value of the convergence factor ($\mu$).

16. A method according to claim 11, wherein the difference between the secondary amplification elements ($\hat{G}^r_{ax,t+1}$) and the primary amplification elements ($\hat{G}^r_{ax,t}$) between two iteration steps is dependent on the magnitude of the primary amplification elements.

17. A method according to claim 11, wherein the secondary amplification elements ($\hat{G}^r_{ax,t+1}$) are dependent on the primary amplification elements ($\hat{G}^r_{ax,t}$), the error ($\epsilon_{xy,t}$), a percentile (r) and a convergence factor ($\mu$) in accordance with the mathematical formula:

$$\hat{G}^r_{ax,t+1} = \begin{cases} \hat{G}^r_{ax,t}\left(1 + \mu\sqrt{\dfrac{r}{1-r}}\right), & \epsilon_{xy,t} > 0 \\ \hat{G}^r_{ax,t}\left(1 - \mu\sqrt{\dfrac{1-r}{r}}\right), & \epsilon_{xy,t} < 0 \end{cases}$$

18. A method according to claim 11, wherein if the secondary amplification elements ($\hat{G}^r_{ax,t+1}$) in an iteration step are greater than a predetermined maximum value ($\hat{G}^r_{max}$), said the secondary amplification elements are set to the predetermined maximum value, whereas the secondary amplification elements are set to a predetermined minimum value if the secondary amplification elements are less than the predetermined minimum value ($\hat{G}^r_{min}$) in an iteration step.

19. Apparatus for estimating a statistical measurement of path loss in a radio communications system that includes at least one primary radio station and at least one secondary radio station, the primary and secondary radio stations including transmitters and receivers that communicate with one another over downlink radio channels in a direction from the primary stations to the secondary stations and over uplink radio channels in a direction from the secondary radio stations to the primary radio stations, wherein respective pairs of uplink and downlink radio channels form a connection between a primary and a secondary radio station, and wherein the connections are subjected to path loss and interference, the apparatus comprising:

power level determining devices for determining power levels ($p_{i,t}$ i=1 ... m) transmitted by the transmitters on at least one radio channel;

power level measuring devices for measuring the power level ($s_{xy,t}$) received on the radio channel in a number of receivers;

means for generating start values of a statistical measurement of amplification factors of combinations of primary radio station pairs; and means for generating a power level element matrix, wherein the means for generating a power level element matrix generates an estimated value of a statistical measurement ($\hat{G}^r_{ax,t}$) of a stochastically distributed amplification factor ($G_{ax,t}$) for each combination of the transmitter and receiver pairs and stores respective values in the power level element matrix as an observation of the statistical measurement of the amplification factor ($\hat{G}^r_{ax,t}$; $0<\hat{G}^r_{ax,t}<1$) of pair-wise combinations of primary radio stations.

20. Apparatus for estimating a statistical measurement of path loss in a radio communications system that includes at least one primary radio station and at least one secondary radio station, the primary radio stations including at least one transmitter and the secondary radio stations including at least one receiver, the transmitter and receiver communicating with each other over connections that use radio channels, wherein respective pairs of uplink and downlink radio channels form a connection, and wherein the connections are subjected to path loss and interference, the apparatus comprising:

power level determining devices for determining power levels ($p_{i,t}$ i=1 ... m) transmitted from the transmitters on at least one radio channel;

power level measuring devices for measuring the power level ($s_{xy,t}$) received on the radio channel (chy) in at least one receiver;

means for generating start values of a statistical measurement of amplification factors of pair-wise combinations of primary radio stations; and means for generating a power level element matrix, wherein the means generating a power level element matrix generates an estimated value of a statistical measurement ($\hat{G}^r_{ax,t}$) of a stochastically distributed amplification factor ($G_{ax,t}$) for each pair-wise transmitter and receiver combination and stores respective values in the power level element matrix as an observation of the statistical measurement of the amplification factor ($\hat{G}^r_{ax,t}$; $0<\hat{G}^r_{ax,t}<1$) of combinations of primary radio station pairs.

21. Apparatus for estimating a statistical measurement of path loss in a radio communications system that includes at least one primary radio station and at least one secondary radio station, the secondary radio stations including at least one transmitter and the primary radio stations including at least one receiver, the transmitter and receiver communicating with each other over connections that use radio channels, wherein the connections are subjected to path loss and interference, the apparatus comprising:

power level determining devices for determining power levels ($p_{i,t}$ i=1 ... m) transmitted from the transmitters on at least one radio channel;

power level measuring devices for measuring the power level ($s_{xy,t}$) received on the radio channel in at least one receiver;

means for generating start values of a statistical measurement of amplification factors of combinations of primary radio station pairs; and means for generating a power level element matrix, the means for generating a power level element matrix generates an estimated value of a statistical measurement ($\hat{G}^r_{ax,t}$) of a stochastically distributed amplification factor ($G_{ax,t}$) for each combination of a transmitter and receiver pair and stores respective values in the power level element matrix as an observation of the statistical measurement of the amplification factor ($\hat{G}^r_{ax,t}$; $0<\hat{G}^r_{ax,t}<1$) of pair-wise combinations of primary radio stations.

22. Apparatus according to claim 19, wherein the power level determining device and the power level measuring device are included in a base station controller, and wherein the start values generating device and the means for generating power level element matrix are included in a mobile services switching centre.

23. A method of allocating channels to a primary radio station that shall be installed in a radio communications system that includes a number of primary radio stations and a number of secondary radio stations that communicate with one another over radio channels, the method comprising the steps:

a) generating an estimated value of the statistical measurement of amplification factors of all combinations of primary radio station pairs in the existing radio communications system;

b) measuring power levels in the primary radio station to be installed on a number of channels in the radio communications system;

c) generating estimated values of the statistical measurement of amplification factors of all pair-wise combinations of the existing primary radio stations and the primary radio station to be installed;

d) registering the power levels transmitted by the secondary radio stations in the radio communications system, the radio channels used by the secondary radio stations, and the primary radio stations to which the secondary radio stations belong;

e) estimating those power levels that can be expected to be received on each radio channel of those secondary stations that do not belong to the primary radio station to be installed, with the aid of those values generated in step c) of the statistical measurement of the amplification factors;

f) estimating those power levels which the secondary radio stations belonging to existing primary radio stations in the radio communications system are expected to receive if the primary radio station to be installed transmit a certain power level on the various radio channels in the radio communications system, with the aid of those values generated in step b) of the statistical measurement of the amplification factors; and g) selecting channels for the primary radio station to be installed in dependence of the power level estimates made in step d) and step e).

24. A method of allocating channels to connections that shall be established in a radio communications system that includes a number of primary and secondary radio stations which communicate with one another over radio channels, the method comprising the steps of:

a) generating the values of the statistical measurement of amplification factors of all pair-wise combinations of the primary radio stations in the radio communications system;

b) registering the power levels transmitted by the secondary radio stations in the radio communications system, the radio channels used by the secondary radio stations, and the primary radio stations to which the secondary radio stations belong;

c) estimating the power levels that can be expected to be received on each radio channel in the primary radio station in which the call connection shall be set up, by using the values of the statistical measurement of the amplification factors generated in step a);

d) estimating the power levels that the secondary radio stations in the radio communications system can be expected to receive if the primary radio station in which the call connection shall be set up should transmit a certain power level on the various radio channels in the radio communications system, by using the values of the statistical measurement of the amplification factors generated in step a); and e) choosing the radio channel to be used to set up the call connection in dependence on the power level estimates made in step c) and step d).

* * * * *